Patented Apr. 16, 1929.

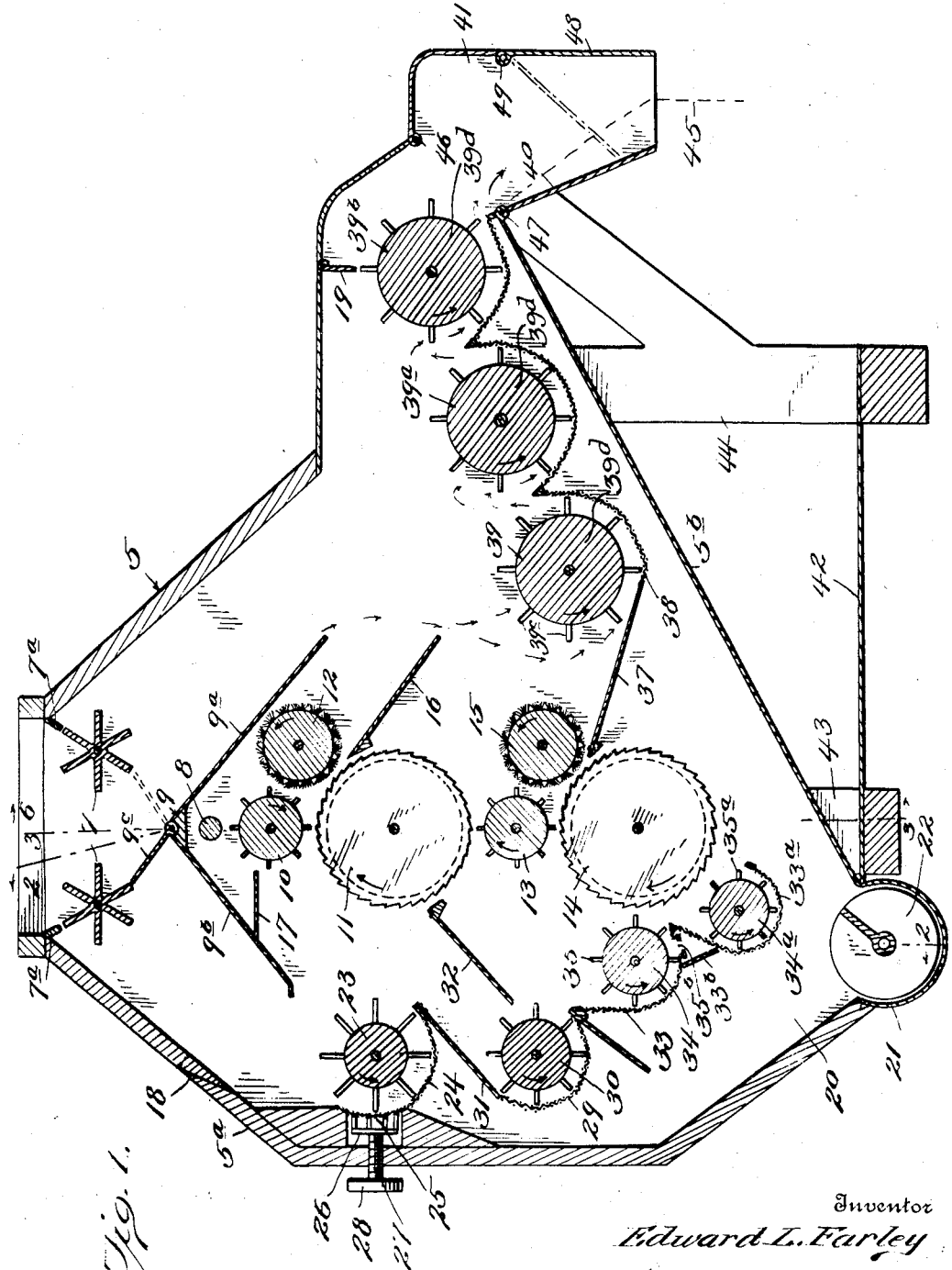

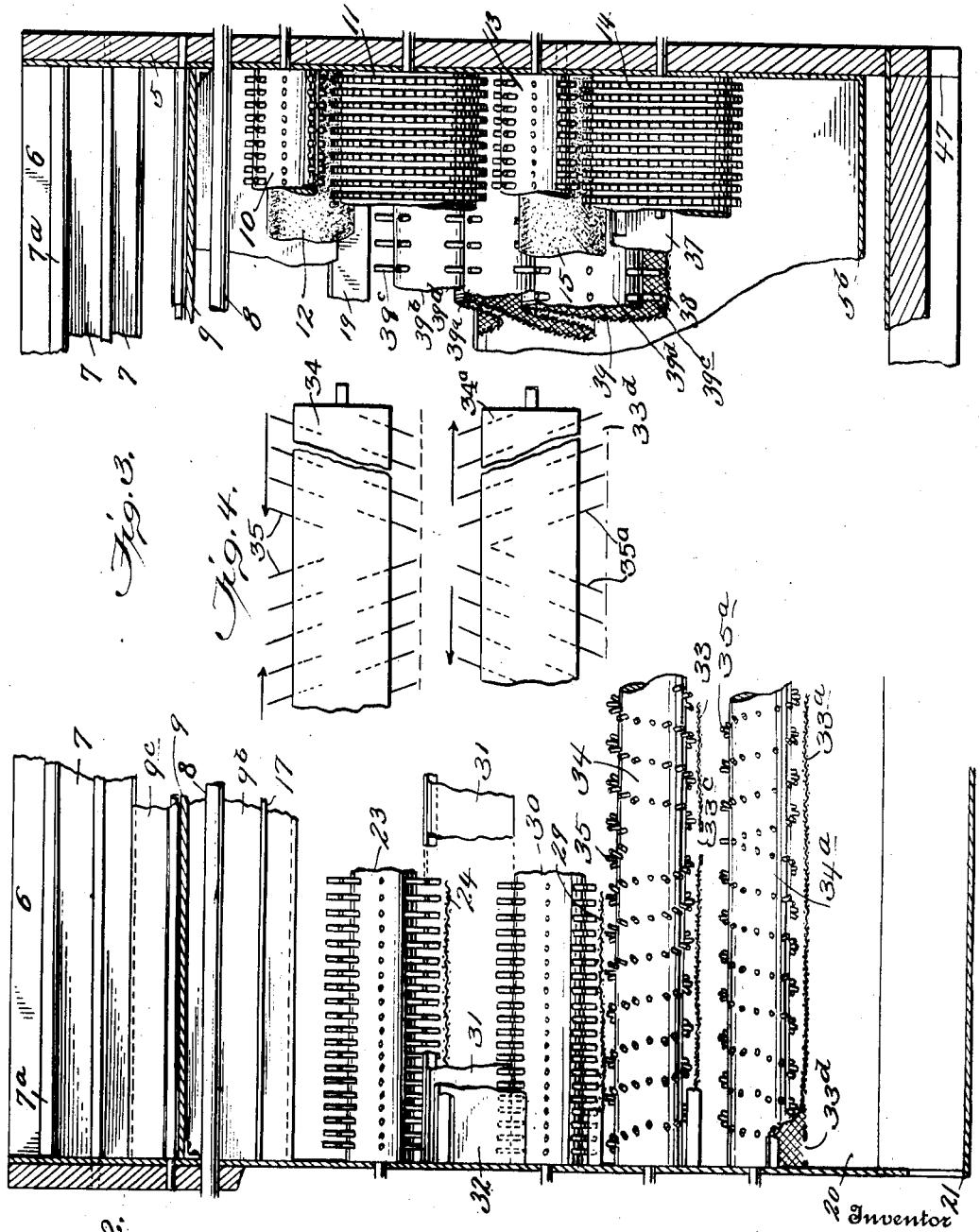

1,709,663

UNITED STATES PATENT OFFICE.

EDWARD L. FARLEY, OF JONESBORO, ARKANSAS.

COTTON CLEANER.

Application filed January 14, 1928. Serial No. 246,811.

This invention relates to a cotton cleaner, and the primary object of the same is to provide a cleaner organization of a comparatively simple form which constitutes an improvement of my cleaner, the application for which was executed the 6th and 19th days of December, 1927, filed January 14, 1928, Ser. No. 246,810.

The same objects or purposes are present in this improvement as in the above noted application, and it is proposed to similarly embody mechanism in the present structure for directing cotton of a bolly character to a boll breaker, or receiving the cotton direct without passing through the boll breaker, and to subject both grades of cotton to the action of a recleaning mechanism so as to render the cotton in an advantageous condition for effective ginning and the production of a superior commercial sample grade of cotton.

In my aforesaid application there is a single spirally spiked conveyer roller arranged in advance of the lowermost element of the cleaning devices and which consists of a saw cylinder, and from the cylinder the cotton is delivered into a recleaning group of spiked rollers, and from the latter passes to a gin stand, or is otherwise delivered from the cleaner. In the present improvement the single spirally spiked roller in advance of the lower saw cylinder of the former application is replaced by two conveyer rollers which are spirally spiked and have the spikes thereof in reverse positions so as to convey the cotton in opposite directions relatively to the lower saw cylinder.

The purpose and aim of this improvement is to more effectively and to a maximum extent separate the locks of cotton that may still cling to the hulls or portions of hulls that pass downwardly thereto, and to a greater extent free the cotton of any residual trash before it is taken by the lower saw cylinder and conveyed or delivered to the recleaning devices or rollers in rear of the said cylinder.

The invention also consists of the details of construction and arrangement of the several parts which will be more fully hereinafter described and claimed.

In the drawings:—

Fig. 1 is a transverse vertical section through a cleaner embodying the improved features of the invention.

Fig. 2 is a broken sectional view taken in the plane of line 2. 2. Fig. 1.

Fig. 3 is a broken sectional view taken in the plane of line 3. 3. Fig. 1.

Fig. 4 is a detail diagrammatic view of the two spirally spiked conveyers which embody the particular present improved features of invention.

The numeral 5 designates a housing which will be constructed as an enclosure of this type and of a composite nature, or, having a frame $5^a$ and with partial sheet metal structures $5^b$ secured thereto at intervals and which will be hereinafter specifically referred to as contributing to the formation of passages and disposition of the several parts. At the upper extremity of the housing is an inlet 6 having therebelow oppositely disposed fluted rollers 7 driven by suitable interposed mechanism (exterior of the casing and not illustrated) from a main shaft 8 extending longitudinally through the housing and having mounting in suitable bearings. Above the rollers 7 are inwardly inclined deflection boards or chutes $7^a$ which direct the cotton of whatever character towards the fluted rollers 7. Below these rollers 7 is a saddle 9 comprising oppositely inclined deflection board or chute members $9^a$ and $9^b$, and an upper valve $9^c$ which will be operated by any suitable means from the exterior of the housing to throw the same either to the right or to the left to deflect the mass of cotton fed into the housing in either one of the two directions. Directly below the center of the saddle 9 in a vertical disposition are a stripper 10 in the form of a specific roller, a saw cylinder 11 directly beneath the stripper 10, a brush cylinder 12 at the right and above the said saw cylinder, and below the saw cylinder 11 is another stripper 13, a second saw cylinder 14 and a brush cylinder 15, all rotating in the direction of the arrows on these several instrumentalities. At the right of the saw cylinder 11 below the brush cylinder 12 is a downwardly inclined deflection or chute board 16, and between the board chute member $9^b$ and the upper portion of the stripper 10 is a horizontal guard 17 to prevent material passing above the said stripper from beneath the said guard. At the upper left hand side of the housing adjacent to the inlet 6 is an air valve 18 which may be opened or closed as desired and found necessary, and at the opposite side of the housing above part of the mechanism is another air inlet valve 19, these valves 18 and 19 being adjustable or operable to admit a certain amount of air, and in the event that air currents are used to move the foreign matter in a downward direction it will be understood that these valves controlling openings are in favorable positions in the housing to facilitate this operation, and also the valve 19 is pivoted in such manner as to permit removal, in the event of lodgement of foreign substances, which may pass into the machine with the cotton. The lower part of the housing is hopper shaped or forms an outlet hopper 20, which opens into a trough 21 in which is a suitable conveyer or other refuse removing means 22. The lower right hand side of the housing, which is part of the sheet metal enclosure 5$^b$, is inclined inwardly and downwardly towards the said trough 21 and forms the long side of the hopper.

As shown at the left side of the interior of the housing below the valve 18 and at a suitable distance from the saw cylinder 11 is a spiked roller 23 with a screen 24 around the lower portion of the same and in adjacent cooperative relation to a boll breaker 25 comprising a toothed head 26 with an adjusting screw 27 attached thereto and having an exteriorly located and operable hand wheel or analogous device 28 bearing in the adjacent side portion of the housing. This boll breaker may be withdrawn by adjustment from cooperative adjacency to the spiked roller 23, or it may be moved inwardly to perform its function or to operate as a crushing means with the said roller 23 and open and crush the bolls or portions of bolls that may be fed thereto. From the inner lower extremity of the screen 24 downwardly to the upper extremity of a screen 29 around a spiked roller 30, similar to the roller 23, is an outwardly and downwardly inclined deflection board or chute 31 which carries the refuse material passing through the screen 24 downwardly outside of the screen 29 and finally to the trough 21 and removing or conveying means 22 in the latter. In advance of the roller 30 and at a suitable distance below the deflection board or chute 31 is a deflection board or chute 32 which extends from its upper end to a point close to the saw cylinder 11 and terminates adjacent to the upper portion of the roller 30. Meeting the lower extremity of the screen 29 is the upper terminal of a screen 33 which extends downwardly in advance of and around the lower portion of an upper spiked conveyer 34 which stands adjacent to and in cooperative relation with and in advance of the lower saw cylinder 14. Below the spiked conveyer 34 is a second spiked conveyer 34$^a$ surrounded in advance of and having around the lower portion a screen 33$^a$. These conveyers are in the form of rollers with spikes 35 and 35$^a$ secured therein, said conveyers serving as a further separation means of portions of hulls to which cotton locks may still cling when reaching the lower saw cylinder and from which the cotton is separated by the latter cylinder. The spikes 35 of the conveyer 34 are set in spirally inclined form in reverse positions from the center to the ends, and by this means the shells and portions of the shells with the cotton locks clinging thereto are brought into contact with the saw cylinder 14 and fed across the same from the opposite ends to the center, and the shells or portions of the shells and cotton still clinging thereto pass through an opening 35$^b$ in the center of the screen 33 and from this screen fall upon the lower spiked conveyer 34$^a$ wherein the spikes 35$^a$ are also arranged in reverse inclined position from the center to the end, so that the hulls or portions of the hulls having the cotton locks clinging thereto are fed lengthwise and in reverse directions in contact with the lower cylinder 14 towards opposite ends of the said lower conveyer 34$^a$. The cotton that is separated from the hulls or portions of the hulls after passing over the spiked conveyers 34 and 34$^a$ and fed lengthwise of the saw cylinder 14 in reverse directions as specified, is taken up by the said saw cylinder 14 and very fully separated from the hulls or portions of the hulls, and the latter together with any foreign matter that may pass down to the lower spiral conveyer 34$^a$ passes through the lower screen 33$^a$ and falls into the hopper 20 and finally reaches the trough 21 for conveyance out of and away from the cleaner. All of the cotton which passes down to the second or lower saw cylinder 14 is taken up by the latter and hulls or other matter that has a tendency to go over the saw cylinder with the cotton are kicked back by the stripper 13, and the cotton subjected to the action of the brush cylinder 15 and deposited on the outwardly and downwardly inclined deflection board 37 which terminates at its lower end at the inner terminal of a lower screen 38 arranged around the lower portion of a recleaning means consisting of a series of preferably three spiked rollers 39, 39$^a$ and 39$^b$, the screen 38 following around the lower portion of said rollers immediately above the downwardly inclined sheet metal wall or member 5$^b$ of the housing adjacent thereto, said screen terminating and at the upper end of the inner wall 40 of a side outlet or hood 41 which is adapted to be located over a gin stand roller box below and with which the improved cleaner may be associated. The recleaning mechanism comprising the rollers 39, 39$^a$ and 39$^b$ and the lower enclosing screen 38 therefor are so arranged that the spikes 39ᶜ thereof are close enough together as to regularly feed the cotton along the screen 38 and under the rollers in a comparatively thin mass, and move the cotton free of contact with the cores or body cylinders 39ᵈ of the rollers, while the dust and dirt that may be carried over to the lowermost roller 39 from the lower saw cylinder 14 and also carried with the cotton under the remaining rollers 39ᵇ and 39ᶜ, will fall or pass through successive portions of the screen 38 to the hopper below, so that when the cotton reaches the last roller 39ᵇ, it will be materially free of foreign matter and be in first class condition for operation thereon by a gin. As shown the top end 42 of a gin stand, as now commonly built, is represented, and from this top of the gin stand are supports 43 and 44 by which the improved cleaner is applied and supported relatively to the gin stand. While the cleaner can be applied in connection with a gin it is not to be understood that the cleaner in its application is thus specifically limited as it can be used in other ways or connections in the preparation of cotton. It may be used in connection with unloading and cleaning devices for final delivery into place of storage.

Wherever desired and found necessary the parts may be hinged, as for example, at 46 or 47 of the upper portion of the hood to accommodate reducing the size of the hood to adapt the outlet of the cleaner to various sizes of gin inlet structures, a closing off valve 48 being provided for the side outlet or hood 41 hinged at 49, and illustrated in full and dotted lines to demonstrate its operation, and by means of this valve a temporary cessation of feed from the cleaner may be obtained.

Cotton that is not sufficiently hully to require more than the ordinary gin stand to handle and discharge it and other cotton of higher quality is delivered directly to the lowermost roller 39, the valve or gate 9ᶜ is set as shown in full lines in Fig. 1, so that this cotton falls directly to the deflection board or chute member 16, and thence to the said lower spiked recleaning roller 39 and then passes under the latter roller and under the remaining rollers 39ᵃ and 39ᵇ, and is discharged from the cleaner through the hood 41 to the gin stand roller box. The foreign matter taken out or eliminated finds its outlet through the screen 38 and falls to the adjacent lower member or floor 5ᵇ, and is directed downwardly and inwardly thereby to the trough 21 which may have, as heretofore indicated, the conveyer 22 therein, or this conveyer may be replaced by an air pipe under suction influence which is obvious and well known in the art of handling or carrying away foreign matter eliminated from cotton. The mass of cotton passing or progressively fed under the rollers 39, 39ᵇ and 39ᶜ is of such degree of thickness that currents of air may pass downwardly therethrough and carry the dust and trash therefrom through the screen 38.

In the event that the cotton is bolly, to an extent geater than that which would be successfully handled by the gin stand without preliminary treatment, the valve 9ᶜ is thrown over to the right, as shown in dotted lines, and the bolly cotton then passes downwardly over the chute member 9ᵇ to the spiked roller 23 where it may be acted upon by the boll breaker 25, and then continues downwardly to the next spiked roller 30 below, and thence to the spirally spiked conveyers 34 and 34ᵃ and be operated upon by the lower saw cylinder 14. The cotton is delivered across the space between the upper saw cylinder 11 and the spiked roller 23 and thence downwardly to the next roller 30, as just explained and then acted upon by the upper saw cylinder 11 and passed therefrom where a considerable portion of separation of the cotton from the hulls takes place and the mass then passes down to the spiked roller 30. The hully cotton that engages the spiked roller 23 will be delivered across the space between the latter roller and the saw cylinder 11, and through the action of the stripper 10 thrown back into the space or passage between the said upper saw cylinder and the spiked roller 23, and gravitate over the board 32 to the spiked roller 30. Such foreign matter as is taken out or eliminated by the roller 23 passes through the screen 24 and falls to the exit trough 21 having therein the conveyer 22 or other analogous removing means. There will be more or less sifting operation or separation of the foreign matter during downward movement of the cotton, and discharged from the cotton during passage through the space between the upper saw cylinder 11 and to the board 32 to the spiked roller 30, and also below the deflection board or chute 32 as the cotton mass passes to the conveyers 34 and 34ᵃ, and by this means a material help will result in the production of the sample. A given percent of the said cotton will be separated by the upper saw cylinder 11 as above noted, and the foreign matter with the residue of cotton thrown off from the said saw cylinder 11 by centrifugal force and the operation of the stripper 10 will finally gravitate and come in contact with the roller 30 where the operating results are similar to roller 23. When portions of hulls having cotton locks still clinging thereto reach the spirally toothed conveyer 34 they are caused to traverse the saw cylinder 14 from the center towards the ends thereof by the said spiral conveyer, with the result, the entire hull and trash residue will be largely removed before the cotton mass is taken up by the saw conveyer 14 and delivered to the deflection board or chute 37, and by the latter to the lower roller 39 of the recleaning series of rollers 39, 39$^a$ and 39$^b$, any hull particles chancing to come over the cylinder 14 with the cotton being kicked back by the stripper 13. Both brush cylinders 12 and 15 cooperate or function with their respective saw cylinders 11 and 14 in a manner well understood in this art.

In the lower portion of the screen 33 is a central opening 33$^c$ which is shown in Fig. 1 as being provided with a wall 33$^b$ leading to the upper portion of the lower screen 33$^a$ of the lower spiked conveyer 34$^a$, so that any hulls or portions of hulls with locks of cotton still adhering thereto are conveyed or directed to the center of the said lower conveyer 34$^a$, and by the latter these remaining hulls and locks of cotton are caused to travel over the lower saw cylinder 14 outwardly in opposite directions towards the ends of said saw cylinder, the hulls passing through openings 33$^d$ at the ends of the screen 33$^a$ and falling into the trough 21, and when the hulls or portions of hulls with locks of cotton still adhering thereto are finally subjected to the treatment of the lower spiked conveyer 34$^a$, a maximum separation of the cotton from the hulls or portions of hulls will ensue and the mass then subjected to treatment by the lower saw cylinder 14 as heretofore explained. As shown in diagrammatic form by Fig. 4, the movement of the hulls and cotton relatively to the two spiked conveyers 34 and 34$^a$ is indicated by arrows, and the opening 33$^c$ in the center of the lower portion of the screen 33 is also indicated in a central position relatively to the lower spiked conveyer 34$^a$. It will be seen that the lower conveyer 34$^a$ is located somewhat under the saw cylinder 14, but in view of the motions of the said lower spiked conveyer 34$^a$ and the saw cylinder 14, the spikes of the said lower conveyer will throw the cotton towards and be taken up by the said lower saw cylinder and conveyed to the recleaning rollers located in rear of said saw cylinder as hereinbefore explained.

Another important feature of the present invention is the recleaning rollers 39, 39$^a$ and 39$^b$ located and receiving the cotton as hereinbefore described, so that when the cotton is delivered from the last of the series of rollers 39$^b$ to the side outlet or hood 41, the cotton will be very largely relieved of all particles of hulls and other foreign matter. The spikes 39$^c$ of the rollers pass between the spikes of the succeeding rollers throughout the series of rollers 39, 39$^a$ and 39$^b$, there being just enough space between the spikes to afford a clearance of the said spikes during rotation of the rollers, and as a consequence the cotton is prevented from passing upwardly through the spaces between the rollers during its traverse under the entire series of rollers. When the cotton reaches the hood 41 and is deposited in the gin, it has not been wasted and the fibers thereof have not been twisted or broken, because the cotton is prevented from passing between these recleaning rollers. The upward inclination of the group of recleaning rollers 39, 39$^a$ and 39$^b$ is especially effective in performing the cleaning operation as the cotton is forced to move in an upwardly inclined direction with some little resistance which will be more effective in separating the dirt, dust and trash therefrom before delivery of the cotton to the hood 41.

From the foregoing it will be seen that the parts of the cleaner are comparatively simple in their construction and operation, and when air currents are admitted through the valves and allowed to descend or be directed downwardly by the operation of the mechanism the cotton will be more thoroughly cleaned, and especially after leaving the recleaning rollers 39, 39$^a$ and 39$^b$.

It is proposed to modify the proportions and minor details of construction of the several parts within the scope of the appending claims, and to use such mechanism for connecting and operating the several parts to impart thereto the purposed direction of rotation as may be desired and well known to those skilled in the art.

What is claimed as new is:—

1. A cotton cleaner of the class specified, comprising a housing having a top inlet and a lower side outlet, an upper deflecting means of angular form below the inlet provided with a movable valve at the top thereof to direct the cotton in either one of two directions through the cleaner, a boll breaker within the cleaner at the side thereof opposite the discharge outlet, cleaning instrumentalities each including a saw cylinder, superposed spiked conveyers disposed in advance of the lower saw cylinder, the upper conveyer directing the broken hulls carrying locks of cotton from the ends towards the center thereof lengthwise of the saw cylinder and the lower conveyer receiving a portion of the hulls carrying locks of cotton from the upper conveyer and directing the mass from the center towards the ends thereof lengthwise of the said cylinder, and a lower plurality of recleaning spiked rollers in rear of the lower saw cylinder and extending from the latter to the outlet and adapted to receive hully cotton that has been treated and conveyed thereto by the lower saw cylinder or cotton that has not required the treatment similar to bolly cotton that may be fed directly from the said deflecting means.

2. In a cotton cleaner of the class specified, a housing having a top inlet and an outlet at one side and also provided with an upper angular partition consisting of divergent deflection boards provided with a valve at the top thereof, and whereby hully cotton may be deflected to one side of the cleaner and cotton of a reasonably good grade may be deflected to the opposite side portion of the cleaner, groups of superposed cleaning instrumentalities within the housing below the angular partition and each including a saw cylinder, a pair of spiked conveyers with the spikes thereof spirally arranged at reverse angles and located in advance of the lower saw cylinder, and a plurality of upwardly inclined spiked recleaning rollers leading from the rear of the lower saw cylinder to the outlet and adapted to receive cotton that has been hully and the hulls opened and removed, or cotton that is of a reasonably good grade directly from the deflection boards.

3. In a cotton cleaner of the class specified, a housing having a top inlet and an outlet at one side and also provided with an angular partition consisting of divergent deflection boards provided with a top valve and whereby hully cotton may be deflected through one side of the cleaner and treated and cotton of a reasonably good grade may be conducted through the opposite side of the cleaner without treatment, groups of superposed cleaning instrumentalities each comprising a saw cylinder, a brush and stripper for acting upon hully cotton, a pair of spirally spiked conveyers disposed in advance of and cooperating with the lower saw cylinder and having the spikes thereof in reverse relation respectively from the ends to the center and from the center to the ends thereof, and a lower group of recleaning spiked rollers in rear of the lower saw cylinder and to which the cotton that may be hully is fed after treatment by the lower saw cylinder or cotton that does not require the treatment of the said instrumentalities may be directly supplied from one of the deflection boards of the angular partition.

4. In a cotton cleaner of the class specified, a housing having a top inlet and a side outlet and provided with an upper angular partition provided with a valve at the top thereof, whereby hully cotton may be deflected through one side of the cleaner and subjected to treatment and cotton of reasonably good grade may be conducted through the opposite side of the cleaner without treatment, a boll breaker below the partition and to which the hully cotton is supplied for treatment, groups of superposed cleaning instrumentalities within the housing below the angular partition and at one side of the boll breaker, conveying means disposed adjacent to and in advance of the lower member of the said cleaning instrumentalities and each having spirally arranged spikes reversely positioned in the respective conveyers, and a recleaning mechanism in rear of the said lower portion of the lower member of the cleaning instrumentalities and to which hully cotton that has been treated may be supplied and further cleaned and cotton that is of a reasonably good grade may be directed from the deflection boards without treatment.

5. In a cotton cleaner of the class specified, a housing having a top inlet and side outlet and provided with upper deflecting means to direct the cotton of different grades in either one of two directions through the housing, a boll breaker at the side of the cotton cleaner opposite the outlet and to which hully cotton is fed and directly treated, groups of superposed cleaning instrumentalities at one side of the boll breaker and each embodying a saw cylinder and conveyers provided with spirally arranged spikes extending in reverse directions respectively from the ends to the center and from the center to the ends, the upper conveyer feeding the hulls or portions of the hulls carrying locks of cotton to the lower conveyer and both conveyers causing the locks of cotton adhering to the portions of hulls to be moved longitudinally with respect to the lower saw cylinder, and recleaning means in rear of the lower saw cylinder to which the hully cotton that has been treated may be fed by the said latter cylinder, or to which cotton of a better grade may be directly supplied from a portion of said deflecting means.

In testimony whereof I have hereunto set my hand.

EDWARD L. FARLEY.